US008284425B2

(12) United States Patent
Kasatani

(10) Patent No.: US 8,284,425 B2
(45) Date of Patent: Oct. 9, 2012

(54) EXTERNAL DEVICE DOCUMENT INPUT AND OUTPUT DEVICE AND EXTERNAL DEVICE DOCUMENT INPUT AND OUTPUT METHOD

(75) Inventor: Kiyoshi Kasatani, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 1557 days.

(21) Appl. No.: 11/509,590

(22) Filed: Aug. 25, 2006

(65) Prior Publication Data
US 2007/0046977 A1 Mar. 1, 2007

(30) Foreign Application Priority Data

Aug. 31, 2005 (JP) .................................. 2005-251306

(51) Int. Cl.
G06F 3/12 (2006.01)
G06K 15/00 (2006.01)

(52) U.S. Cl. ...................... 358/1.15; 358/1.16; 358/1.13; 358/1.14

(58) Field of Classification Search ......... 358/1.13–1.18
See application file for complete search history.

(56) References Cited

U.S. PATENT DOCUMENTS

| | | | | |
|---|---|---|---|---|
| 7,209,250 | B2* | 4/2007 | Nakao ............................ | 358/1.15 |
| 2005/0012953 | A1 | 1/2005 | Fujishige et al. | |
| 2005/0024674 | A1 | 2/2005 | Fujishige et al. | |
| 2005/0062990 | A1 | 3/2005 | Fujishige et al. | |
| 2005/0062991 | A1 | 3/2005 | Fujishige et al. | |
| 2005/0066274 | A1 | 3/2005 | Fujishige et al. | |
| 2005/0091325 | A1 | 4/2005 | Kuwana et al. | |
| 2005/0097020 | A1 | 5/2005 | Nomura et al. | |
| 2005/0188226 | A1 | 8/2005 | Kasatani | |
| 2005/0195446 | A1 | 9/2005 | Kasatani | |
| 2005/0210031 | A1 | 9/2005 | Kasatani | |
| 2005/0219640 | A1 | 10/2005 | Kasatani | |
| 2006/0168000 | A1* | 7/2006 | Bodlaender ................... | 709/205 |
| 2006/0248129 | A1* | 11/2006 | Carnes et al. ................. | 707/204 |
| 2007/0033637 | A1* | 2/2007 | Yami et al. ........................ | 726/2 |

FOREIGN PATENT DOCUMENTS

| | | |
|---|---|---|
| JP | 2004-356822 | 12/2004 |
| JP | 2005-025390 | 1/2005 |
| JP | 2005-025541 | 1/2005 |
| JP | 2005-025544 | 1/2005 |
| JP | 2005-027067 | 1/2005 |
| JP | 2005-031959 | 2/2005 |
| JP | 2005-031961 | 2/2005 |
| JP | 2005-049972 | 2/2005 |

(Continued)

Primary Examiner — Dov Popovici
(74) Attorney, Agent, or Firm — Harness, Dickey & Pierce, P.L.C.

(57) ABSTRACT

An external device document input and output device connected to a network and using a plurality of communication protocols, the external device document input and output device communicating documents in various data forms to and from a plurality of information devices, the external device input and output device including a first identifying part configured to implement a process of identification so a function of the information device can be used by individual identification; a second identifying part configured to implement a process of identification so a function of the external device document input and output device can be used by individual identification; and a registration part configured to register folders permitted to be used by a user identified by the first identifying part and the second identifying part and register setting information of a recording medium provided in the external device document input and output device, in common media.

18 Claims, 17 Drawing Sheets

FOREIGN PATENT DOCUMENTS

| | | |
|---|---|---|
| JP | 2005-049985 | 2/2005 |
| JP | 2005-051377 | 2/2005 |
| JP | 2005-085069 | 3/2005 |
| JP | 2005-085144 | 3/2005 |

* cited by examiner

FIG.7

MANAGER SETTING INFORMATION

<MANAGEMENT SETTING TABLE>
(1) EXTERNAL DEVICE IDENTIFICATION: YES
(2) PRIORITY IDENTIFICATION SETTING: FIRST = FIRST EXTERNAL DEVICE, SECOND = INDIVIDUAL MENU DEVICE
(3) FIRST EXTERNAL DEVICE IDENTIFICATION: YES
(4) FIRST EXTERNAL DEVICE IDENTIFICATION SETTING: TYPE = WINDOWS (REGISTERED TRADEMARK) SERVER,
    DOMAIN NAME = YES, IP ADDRESS = YES
(5) SECOND EXTERNAL DEVICE IDENTIFICATION: YES
(6) SECOND EXTERNAL DEVICE IDENTIFICATION SETTING: TYPE = MULTI FUNCTION PROCESSING MACHINE,
    DOMAIN NAME = NO, IP ADDRESS = NO
(7) AUTOMATIC REGISTRATION IN INDIVIDUAL MENU
(8) INDIVIDUAL MENU PASSWORD IS AUTOMATICALLY RENEWED
(9) LOG-IN BY ONLY INDIVIDUAL MENU IDENTIFICATION WHEN EXTERNAL SERVER CONNECTION HAS FAILED: YES
(10) INDIVIDUAL MENU AUTOMATIC DELETION SETTING: AUTOMATIC DELETION=YES, STORING TIME = 7 DAYS,
     WARNING INDICATION = YES
(11) INITIAL VALUE USER OF INDIVIDUAL REGISTRATION SETTING INFORMATION

FIG.8

INDIVIDUAL SETTING INFORMATION

<INDIVIDUAL SETTING TABLE>
(1) KANA WRITING: RICOH TARO
(2) NAME: RICOH TARO
(3) BELONGING TO: DEVELOPING BUSINESS PART
(4) INDIVIDUAL MENU IDENTIFICATION INFORMATION
(5) FIRST EXTERAL DEVICE IDENTIFICATION INFORMATION
(6) SECOND EXTERAL DEVICE IDENTIFICATION INFORMATION
(7) INDIVIDUAL MENU AUTOMATIC DELETION: PERMIT
(8) INDIVIDUAL MENU AUTOMATIC DELETION SETTING STORING AREA:
    AUTOMATIC DELETION = YES, STORING DAYS: 3 DAYS
(9) FUNCTION LIMITATION INFORMATION
(10) REGISTRATION ADDRESS INFORMATION: NAME = HOME DIRECTLY, NETWORK PASS = YES
(11) COMMON MEDIA INFORMATION: NAME = HOME DIRECTLY, REGISTRATION ADDRESS = HOME DIRECTLY
(12) NEWEST USING STATE STORING AREA

FIG.12

| COMMON MEDIA | | |
|---|---|---|
| ID | NAME | FILE ADDRESS ID |
| 1 | COMPACT FLASH | 1 |
| 2 | SMART MEDIA | 2 |
| 3 | MEMORY STICK | 3 |
| 4 | SD MEMORY CARD | 4 |
| 5 | CD/DVD | 5 |
| 6 | SENDING DOCUMENT | 7 |
| 7 | HOME DIRECTORY | 8 |

LINK
ONLY TRANSMISSION MASSAGE ⇒

| | | FILE ADDRESS | | |
|---|---|---|---|---|
| ID | NAME | NETWORK PASS | IDENTIFICATION USER NAME | IDENTIFICATION PASSWORD |
| 1 | COMPACT FLASH | file:///cd:/ | — | — |
| 2 | SMART MEDIA | file:///sm:/ | — | — |
| 3 | MEMORY STICK | file:///ms:/ | — | — |
| 4 | SD MEMORY CARD | file:///sd:/ | — | — |
| 5 | CD/DVD | file:///cd:/ | — | — |
| 6 | DOCUMENT REGISTRATION FOLDER | file://server/uplord/ | user1 | pass123 |
| 7 | SENDING DOCUMENT FOLDER | http://www.server.com/uplord/ | hanako | hana12 |
| 8 | HOME DIRECTORY | file://winsvr/taro/ | taro | taropass123 |

EXTERNAL DEVICE DOCUMENT INPUT AND OUTPUT DEVICE AND EXTERNAL DEVICE DOCUMENT INPUT AND OUTPUT METHOD

BACKGROUND OF THE INVENTION

1. Field of the Invention

The present invention relates to external device document input and output devices and external device document input and output methods, and more particularly, to an external device document input and output device that is connected to a network and uses plural communication protocols, the document input and output device communicating documents in various data forms to and from plural information devices, and an external device document input and output method.

2. Description of the Related Art

Recently and continuingly, a network communication system having a document input and output device with a document OCR implementing device, the document input and output device being connected to a network and using plural communication protocols, the document input and output device communicating documents in various data forms to and from plural information devices, has been developed.

In such a network communication system, various application services wherein a document input and output device is used as a core are provided. For example, a document image read out or data made by an information device is sent to a designated address by e-mail, sent by a facsimile, or file-transferred to another information device. Information written in a received e-mail or an image in a file attached to the e-mail is recorded and output, sent to a designated facsimile, or file-transferred to the information device. Storing management of the data sent to the device is performed. See Japanese Laid-Open Patent Application Publication No. 2004-356822, for example.

It is preferable that the external device document input and output device connecting such a network be connected to plural information devices via the network so that the document file received and sent by the external device document input and output device can be provided to an opponent user via various communication means or ways.

SUMMARY OF THE INVENTION

Accordingly, embodiments of the present invention may provide a novel and useful external device document input and output device and external device document input and output method that provide improvements over the prior art.

More specifically, the embodiments of the present invention may provide an external device document input and output device and external device document input and output method, whereby sending and receiving the document file to and from the information devices can be properly and easily implemented.

One aspect of the present invention may be to provide an external device document input and output device that is connected to a network and uses a plurality of communication protocols, the external device document input and output device communicating documents in various data forms to and from a plurality of information devices, the external device input and output device including: a first identifying part configured to implement a process of identification so that a function of the information device can be used by individual identification; a second identifying part configured to implement a process of identification so that a function of the external device document input and output device can be used by individual identification; and a registration part configured to register folders permitted to be used by a user identified by the first identifying part and the second identifying part and register setting information of a recording medium provided in the external device document input and output device, in common media; wherein the folder permitted to be used by the user and registered in the common media is read, and a folder that is a subject of sending the selected document to is designated and the document is sent to the folder.

It may be also the aspect of the present invention to provide an external device document input and output device that is connected to a network and uses a plurality of communication protocols, the external device document input and output device communicating documents in various data forms to and from a plurality of information devices, the external device input and output device including: first identifying means for implementing a process of identification so that a function of the information device can be used by individual identification; second identifying means for implementing a process of identification so that a function of the external device document input and output device can be used by individual identification; and registration means for registering folders permitted to be used by a user identified by the first identifying means and the second identifying means and register setting information of a recording medium provided in the external device document input and output device, to common media; wherein the folder permitted to be used by the user and registered in the common media is read, and a folder that is a subject of sending the selected document to is designated and the document is sent to the folder.

It may be also the aspect of the present invention to provide an external device document input and output method of an external device document input and output device, the external device document input and output device being connected to a network and using a plurality of communication protocols, the external device document input and output device communicating documents in various data forms to and from a plurality of information devices, the method including: first identifying step of implementing a process of identification so that a function of the information device can be used by individual identification; second identifying step of implementing a process of identification so that a function of the external device document input and output device can be used by individual identification; and registration step of registering folders permitted to be used by a user identified by the first identifying step and the second identifying step and register setting information of a recording medium provided in the external device document input and output device, in common media; wherein the folder permitted to be used by the user and registered in the common media is read, and a folder that is a subject of sending the selected document to is designated and the document is sent to the folder.

According to the above-mentioned invention, it is possible to identify a folder based on identification information of a server computer connected to the network, obtain user management information managed by an active directory by using the information device where the identification is completed, and register the folder managed by the user management information together with recording media provided in the digital color multiprocessing machine as a holder (home directory) permitted to be used by the user to the common media and manage the folder in a unified manner, so that operability such as file selection can be improved in a digital color multifunctional machine for a specific use that has a limitation in the input operations.

Other objects, features, and advantages of the present invention will become more apparent from the following detailed description when read in conjunction with the accompanying drawings.

BRIEF DESCRIPTION OF THE DRAWINGS

FIG. 7 is a view showing a management setting table of setting information for a manager;

FIG. 8 is a view showing an individual setting table of individual setting information;

FIG. 12 is a table showing relationships between the common media and registration (file) address;

DETAILED DESCRIPTION OF THE PREFERRED EMBODIMENTS

A description of the present invention is now given, with reference to FIG. 1 through FIG. 11, including embodiments of the present invention.

The following embodiment of the present invention is an example where the present invention is applied to so-called digital color multifunction processing machine where a copying function, facsimile function, printing function, scanner function, function for providing an input image (a document image read out by the scanner function or an image input by the printing function or the facsimile function), and others, are combined.

Figure 1:
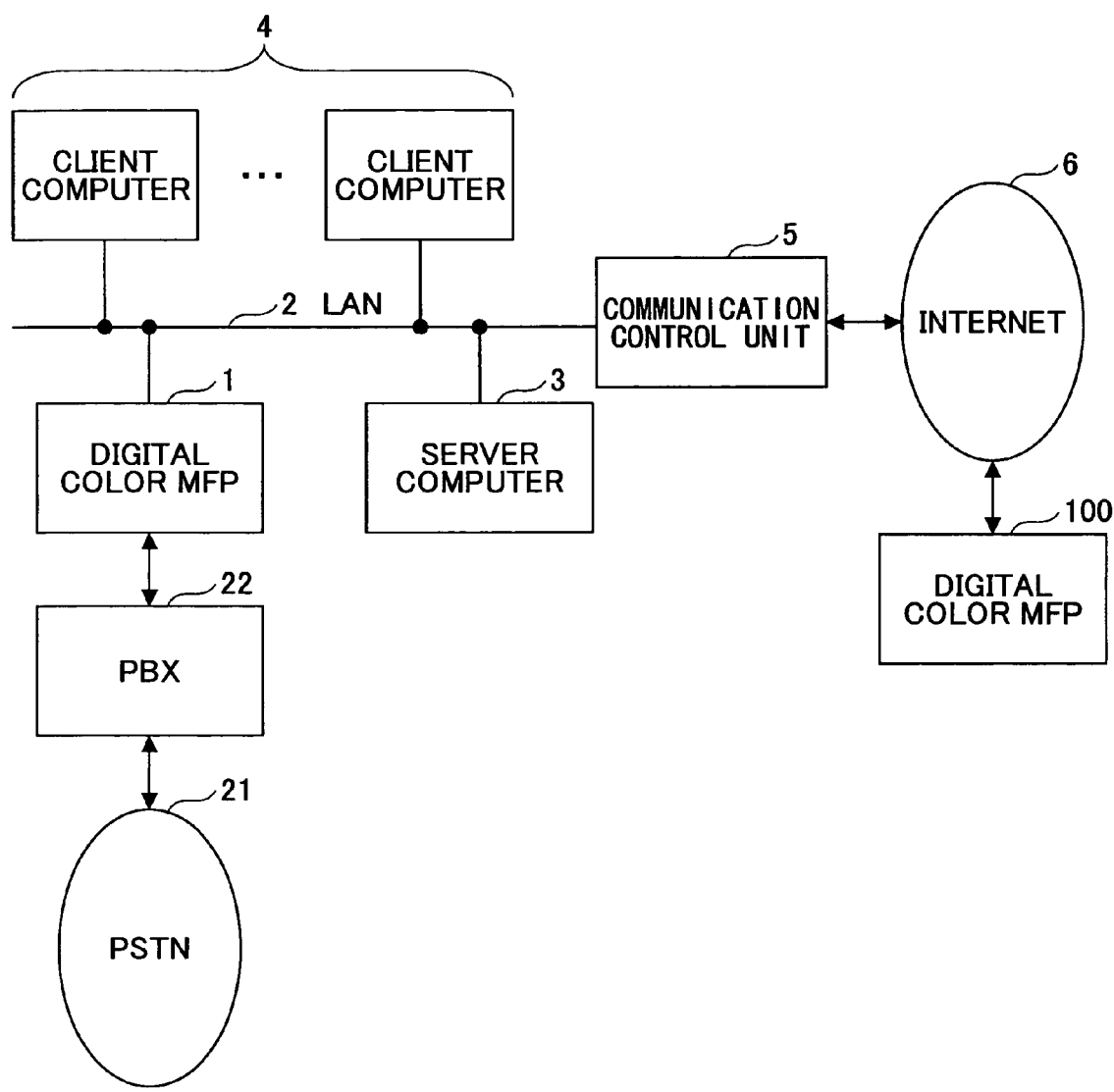
FIG. 1 is a system structural view including a digital color multifunction processing machine of an embodiment of the present invention.

FIG. 1 is a system structural view including a digital color multifunction processing machine of an embodiment of the present invention.

As shown in FIG. 1, in the embodiment of the present invention, a system having the following structure is assumed. A server computer 3 and plural client computers 4 are connected to a digital color multifunction processing machine 1 that is an information processing system via a LAN (Local Area Network) 2 that is a communication network.

The server computer 3 implements various kinds of information processes. For example, the server computer 3 supports FTP or HTTP protocol or realizes a function of a Web server or DNS server (Domain Name Server).

In other words, in this system, an environment where an image processing function of the digital color multifunction processing machine 1 such as an image input function (scanner function), image output function (printing function), image storing function, and others, can be jointly shared on the LAN 2.

Such a system is connected to the Internet 6 via a communication control unit 5 so that data communication between this system and an external environment can be performed via the Internet 6. In addition a digital color multifunction processing machine 100 is provided on the Internet 6. The digital color multifunction processing machine 100 has the same function as the digital color multifunction processing machine 1.

While a router, exchange, modem, DSL modem, or the like is normal as the communication control unit 5, it should be capable of TCP/IP communications as a minimum. In addition, the LAN 2 is not limited to wire communications but may use wireless communication (infrared, electromagnetic wave, or the like). An optical fiber may be used for the LAN 2.

Next, details of the digital color multifunction processing machine 1 are discussed. The explanation of the digital color multifunction processing machine 1 is, of course, applied to the digital color multifunction processing machine 100.

Figure 2:
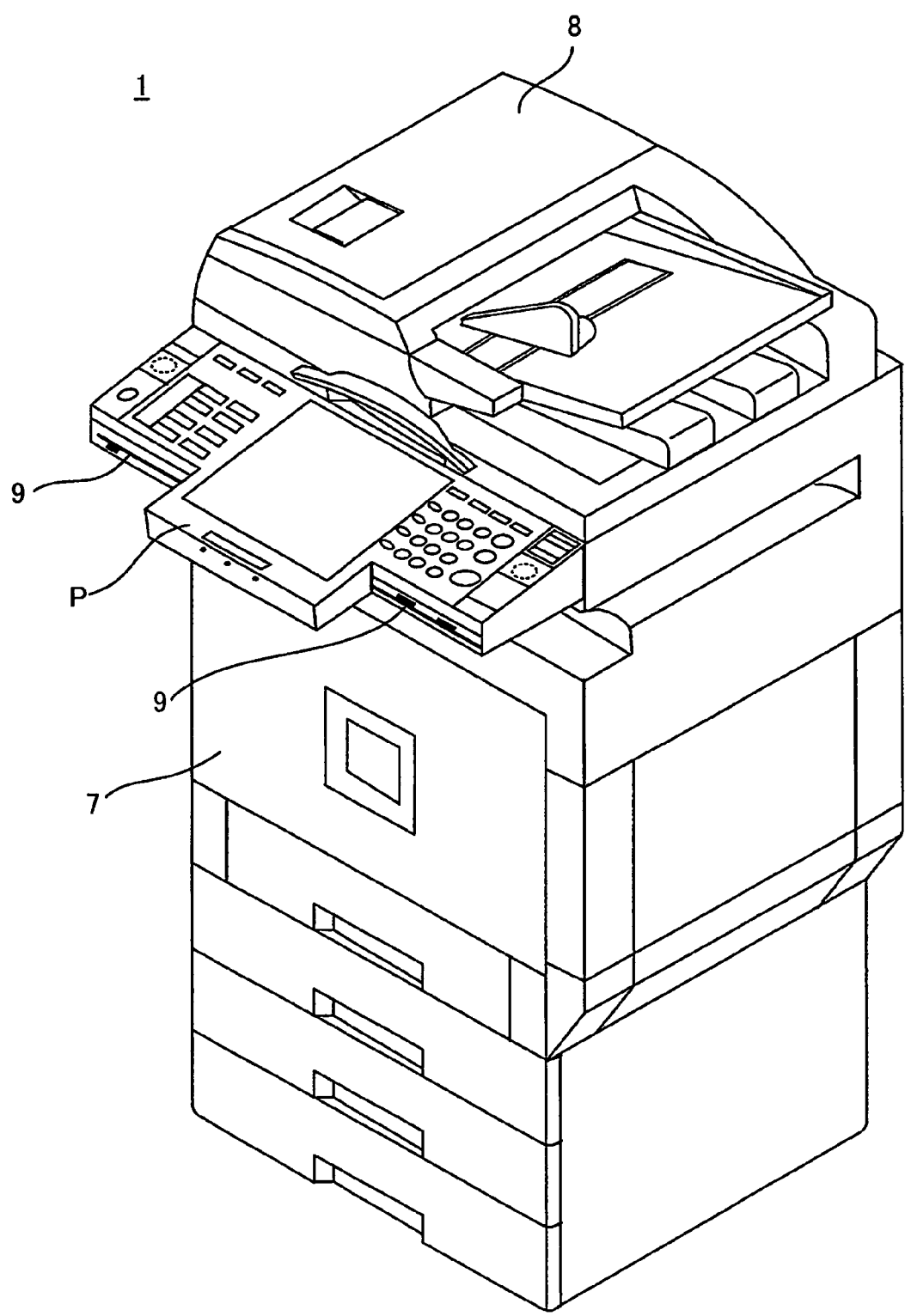
FIG. 2 is a schematic perspective view of the digital color multifunction processing machine.
Figure 3:
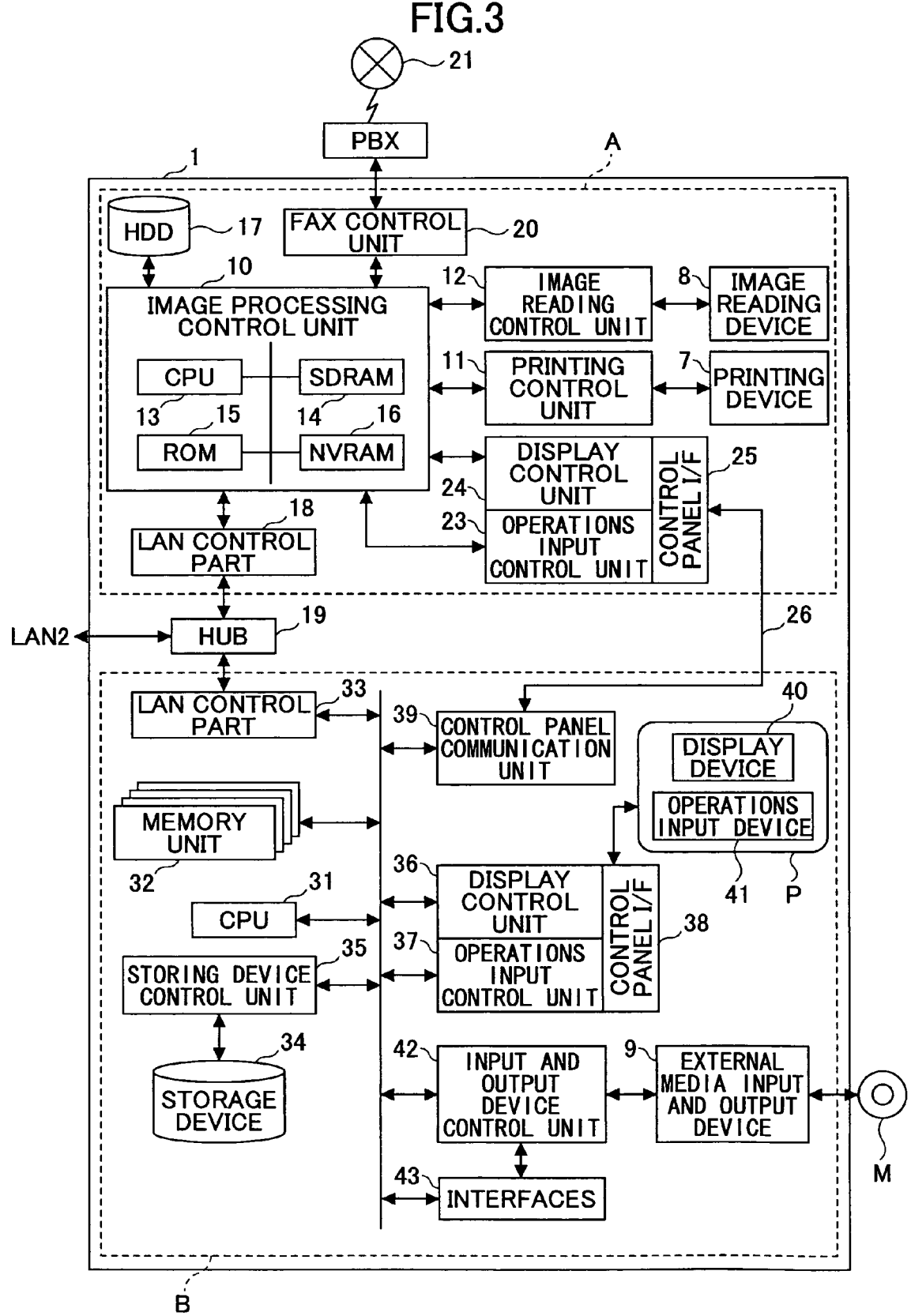
FIG. 3 is a block diagram showing electric connections of parts of the digital color multifunction processing machine.

Here, FIG. 2 is a schematic perspective view of the digital color multifunction processing machine 1. FIG. 3 is a block diagram showing electric connections of parts of the digital color multifunction processing machine 1.

As shown in FIG. 2, in the digital color multifunction processing machine 1, an image reading device 8 is provided at an upper part of a printing device 7. The printing device 7 forms an image on a medium such as a transferring paper. The image reading device 8 reads out the image from a manuscript. An operations panel P is provided at an outside surface of the image reading device 8. The operations panel P displays for an operator and accepts various inputs such as function setting by the operator.

In addition, an external media input and output device 9 is provided at a lower part of the operations panel P so that an inserting opening for receiving a storage medium M (See FIG. 3) is exposed to the outside. The storage medium M is, for example, an optical disk or flexible disk. The external media input and output device 9 reads out program code, image data, or the like stored in the storage medium M and writes the program code, the image data, or the like to the storage medium M.

As shown in FIG. 3, the digital color multifunction processing machine 1 includes an image processing unit part A and an information processing unit part B. A printing device 7 and an image reading device 8 belong to the image processing unit part A. The operations panel P and the external media input and output device 9 belong to the information processing unit part B for performing various information processes.

First, the image processing unit part A is discussed. As shown in FIG. 3, the image processing unit part A having the printing device 7 and the image reading device 8 includes the image processing control unit 10. The image processing control unit 10 implements control of the entire imaging process at the image processing unit part A. A printing control unit 11 and an image reading control unit 12 are connected to the image processing control unit 10. The printing control unit 11 controls the printing device 7. The image reading control unit 12 controls the image reading device 8.

The printing control unit 11 outputs a printing order including the image data to the printing device 7 following the control of the image processing control unit 10. The printing control unit 11 makes the printing device 7 form the image on the transferring paper and output it. Full color printing can be performed by the printing device 7. As a printing method, not only an electrophotographic method but also various types of methods such as an inkjet type, a sublimation thermal transferring type, a silver photographing type, a direct thermal recoding type, or a melting thermal transferring type, can be used.

An image reading control unit 12 drives the image reading device 8 under the control of the image processing control unit 10. The image reading control unit 12 condenses a reflection light of lamp irradiation against the surface of a manuscript onto a light receiving element (for example, CCD (Charge Coupled Device)) by a mirror or lens so as to read it, and makes A/D conversion so as to generate digital image data of RGB 8 bits.

The image processing control unit 10 has a microcomputer structure where a CPU (Central Processing Unit) 13 being a main processor, an SDRAM (Synchronous Dynamic Random Access Memory) 14, a ROM (Read Only Memory) 15, and an NVRAM (Non Volatile RAM) 16 are connected by a bus. The image data read by the image reading device 8 is stored in the SDRAM 14 for a while for image forming by the printing device 7. A control program or the like is stored in the ROM 15. The NVRAM 16 can store the data even at the time of electric power loss when a system log, system setting or log information is recorded.

In addition, an HDD (magnetic disk device) 17, a LAN control part 18 and a FAX control unit 20 are connected to the image processing control unit 10. The HDD 17 is a storing device for storing a large amount of image data or job history. The LAN control part 18 connected the image processing unit part A to the LAN 2 via a HUB 19 that is a line concentrator of an internal LAN provided inside of the device. The FAX control unit 20 implements facsimile control. The FAX control unit 20 is connected to a PBX (Private Branch exchange) 22 connected to a public switched telephone network 21, so that the digital color multifunction processing machine 1 can make contact with a remote facsimile via the public switched telephone network 21.

In addition, a display control unit 23 and an operations input control unit 24 are connected to the image processing control unit 10.

The display part 23 outputs an image display control signal to the information processing unit part B via a communication cable connected to a control panel I/F (interface) 25 by control of the image processing control unit 10. The display part 23 implements control of the image display of the operations panel P of the information processing unit part B.

The operations input control unit 24 inputs an input control signal via the communication cable 26 connected to the control panel I/F 25 by the control of the image processing control unit 10. The input control signal corresponds to functional settings or input operations by the operator from the operations panel P of the information processing unit part B. In other words, the image processing unit part A directly monitors the operations panel P of the information processing unit part B via the communication cable 26.

Therefore, the image processing unit part A connects the communication cable 26 to an image processing unit which a conventional image processing device has so as to use the operations panel P of the information processing unit B. In other words, the operations input control unit 24 and the display control unit 23 of the image processing unit part A operate being connected to the operations panel P.

Under this structure, the image processing unit part A analyzes a printing order command and printing data that are image information from the outside such as the server computer 3, the client computer 4, the facsimile, or the like, so as to convert the printing data into bit-map data to be printed as the output image data. The image processing unit part A analyzes the printing data from the command and determines the operation. The image processing unit part A receives the printing data and the command from the LAN control part 18 or the FAX control unit 20 and operates on them.

In addition, the image processing unit part A can transfer the printing data, manuscript reading data, output image data made by processing these data for output, and compressed data made by compressing these data to the outside such as the server computer 3, the client computer 4, the facsimile, or the like.

Furthermore, the image processing unit part A transfers the reading data of the image reading device 8 to the image processing control unit 10, corrects signal degradation due to quantization of an optical system or a digital signal, and writes the image data in the SDRAM 14. Thus, the image data stored in the SDRAM 14 are converted to the output image data by the printing control unit 11 so as to be output to the printing device 7.

Next, the information processing unit part B having the operations panel P is discussed. As shown in FIG. 3, the information processing unit part B has a microcomputer structure where the information processing unit part B is controlled by a generic OS (Operating System) used for an information processing device generally called a personal computer. The information processing unit part B includes a CPU 31 as a main processor. A memory unit 32 and a storing device control unit 35 are connected by a bus to the CPU 31. The memory unit 32 includes a RAM that is a work area of the CPU 31 and a ROM that is exclusively a reading memory where a starting program is stored. The storing device control unit 35 controls input and output of the data to and from the storing device 34 such as an HDD storing a program or the OS.

A LAN control part 33 is connected to the CPU 31. The LAN control part 33 is a communication interface for connecting the information processing unit part B to the LAN 2 via the HUB 19. An IP address that is a network address allocated to the LAN control part 33 is different from the IP address allocated to the LAN control part 18 of the image processing unit part A. In other words, two IP addresses are allocated to the digital color multifunction processing machine 1 of the embodiment of the present invention. The image processing unit part A and the information processing unit part B are respectively connected to the LAN 2. Data conversion between the image processing unit part A and the information processing unit part B can be performed.

Since the digital color multifunction processing machine 1 is connected to the LAN 12 via the HUB 19, only a single IP address is seemingly allocated. Therefore, it is possible to easily handle connections without damaging a fine appearance.

Figure 4:
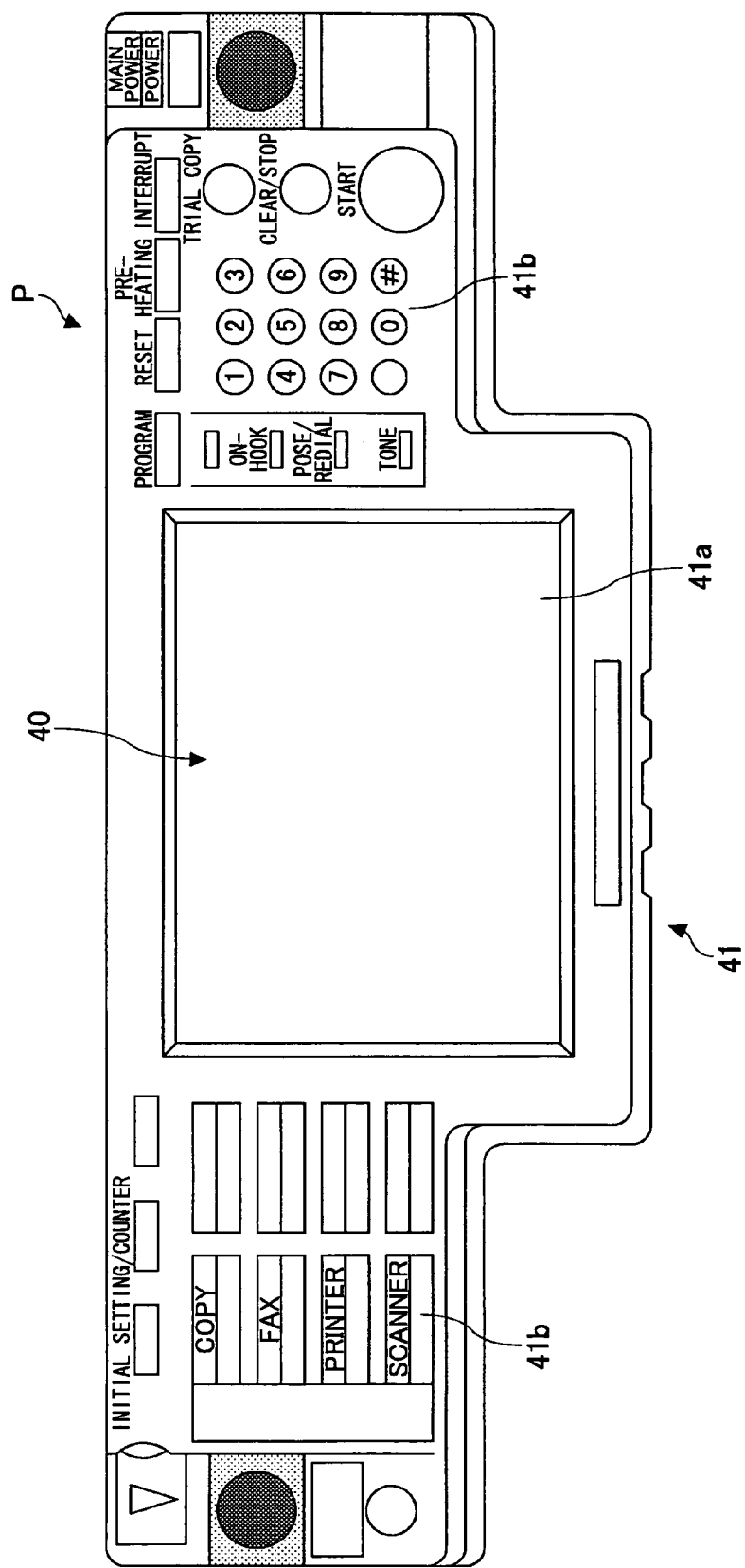
FIG. 4 is a plan view showing a structure of an operations panel.

In addition, a display control unit 36 and an operations input control unit 37 for controlling the operations panel P are connected to the CPU 31. FIG. 4 is a plan view showing a structure of the operations panel P. As shown in FIG. 4, the operations panel P includes a display device 40 and an operations input device 41. The display device 40 is, for example, LCD (Liquid Crystal Display). The operations input device 41 includes a touch panel 41a and a key board 41b. The touch panel 41a is an ultrasonic elastic wave type panel stacked on a surface of the display device 40. The key board 41b has plural keys.

A start key, ten-key, reading condition setting key, clear key, and others are provided on the key board 41b. The start key is used for starting a process such as an image reading process. The ten key is used for input a numerical value. The reading condition setting key is used for setting the address to which the read image data are sent. In other words, the display control unit 36 outputs the image display control signal to the display device 40 via the control panel I/F 38 so as to make the display device 40 display a designated item corresponding to the image display control signal. On the other hand, the operations input control unit 37 receives an input control signal via the control panel I/F 38. This input control signal corresponds to functional settings or input operations by the operator in the operations input device 41.

In addition, a control panel communication unit 39 is connected to the CPU 31. The control panel communication unit 39 is connected to the control panel I/F 25 of the image processing unit part A via the communication cable 26.

The control panel communication unit 39 receives the image display control signal output from the image processing unit part A. The control panel communication unit 39 also transfers the input control signal corresponding to the functional setting or input operations from the operations panel P by the operator, to the image processing unit part A.

As discussed below, the image display control signal from the image processing unit part A received by the control panel communication unit 39 is processed for data conversion for the display device 40 of the operations panel P and then output to the display control unit 36.

In addition, the input control signal corresponding to the functional settings or input operations from the operations panel P by the operator is converted to a format corresponding to a specification of the image processing unit part A and then input to the control panel communication unit 39.

As discussed above, the OS or program implemented by the CPU 31 is stored in the storing device 34. This means that the storing device 34 functions as a storage medium storing the program.

In the digital color multifunction processing machine 1, if the user turns on the electric power, the CPU 31 activates a starting program in the memory unit 32 so that the OS is read from the storage device 34 and written by the RAM in the memory unit 32 so that this OS is activated. Such an OS activates a program corresponding to the operation of the user and reads and stores the information. For example, Windows (Registered Trademark) and others are each known as such an OS. An operating program used for the OS is called an application program. The same type of OS used for the information processing device such as the server computer 3 or the client computer 4, namely a generic OS such as Windows (Registered Trademark) is used as the OS of the information processing unit part B.

As discussed above, the external media input and output device 9 is provided in the digital color multifunction processing machine 1. The external media input and output device 9 is a device for reading the program code or the image data stored in a storage medium M or for storing the program code or the image data in the storage medium M, such as a flexible disk drive device, an optical disk drive device, an MO drive device, or a media drive device. The storing medium M is a medium where various program code sets (control programs) such as various application programs, the device driver, or the OS is stored. The storing medium M is, for example, a flexible disk, a hard disk, an optical disk (CD-ROM, CD-R, CD-RW, DVD-ROM, DVD-RAM, DVD-R, DVD+R, DVD-RW, DVD+RW, and others), or a semiconductor medium (SD memory card (registered trademark), Compact Flash (registered trademark), Memory Stick (registered trademark), Smart Media (registered trademark), or the like). Such an external media input and output device 9 is controlled by an input and output device control unit 42 that is connected by bus to the CPU 31.

Accordingly, the application program stored in the storage device M may be installed in the storage device 34. Because of this, the storage medium M can be the storage medium storing the application program. In addition, the application program may be taken in from the outside via, for example, the Internet or LAN 2 so as to be installed in the storage device 34.

Various interfaces 43 such as USB, IEEE 1394, and SCSI are connected to the input and output device control unit 42. Hence, via the various interfaces 43, various devices such as a digital camera can be connected to the input and output device control unit 42.

Next, a specific process implemented by the digital color multifunction processing machine 1 is discussed. In the digital color multifunction processing machine 1, plural devices implementing different processes from each other, namely the image processing unit part A and the information processing unit part B in this example, can independently perform the processes. Therefore, when the image reading process is implemented by the image processing unit part A, the information processing unit part B can receive e-mail, for example. In this example, since the results of the processes do not affect each other, there is no problem in independent operations of the image processing unit part A and the information processing unit part B.

Furthermore, in the digital color multifunction processing machine 1, each of the functions of the image processing unit part A can be used by the program operated by the information processing unit part B and the result can be a subject of the processing. For example, image data of a document image read by the image reading device 8 of the image processing unit part A is character-recognition processed by a designated application program so that a text document can be obtained.

However, if the image processing unit part A and the information processing unit part B always perform the processes independently from each other, each of the functions of the image processing unit part A cannot be used by the program operated by the information processing unit part B and the result cannot be the subject of the processing. Because of this, in this example, each of the functions of the image processing unit part A cannot be used by operating the application program based on the combination of process modules.

In the image processing unit part A, a module of a control system executed by the image processing control unit 10 is formed by an application program for implementing original functions of a multifunction processing machine by the digital color multifunction processing machine 1. In the digital color multifunction processing machine 1, an interface of a functional module for a network is provided at the LAN control part 18 to which access from only the information processing unit part B via the HUB 19 (LAN 2) can be made.

Based on the functional module for the network, a function provided for a normal multifunction processing machine as a standard and implemented by the image processing control unit 10, such as the scanner function or facsimile function, can be used via the LAN 2. The function cannot be used by the image processing unit part A.

When TCP/IP (Transmission Control Protocol/Internet Protocol) detects a connection requirement for a corresponding port number, a process module of a corresponding function is activated. Here, the TCP/IP always monitors access from the LAN 2.

For example, when the connection of the port number 1002 is requested, a module of a facsimile receiving function is activated. The activated module operates based on the processing requirement from a side requesting the connection so as to reply with a necessary response.

Next, a specific feature of an application program of the information processing unit part B is discussed. A key word generation application is discussed as an example.

The keyword generation application implements the character recognition process for the image data being read so that a keyword is made from the result of the character recognition. In the entirety of the information processing unit part B, each of the application programs is executed under the management of the OS.

In addition, each of the application programs can use the functions provided by the OS. In other word, while the application program is executing the OS is used as a module of the software so that a necessary process is performed. For example, the TCP/IP control module implements a function provided in the OS as a standard, the function being used for communication with other information devices connected by the TCP/IP.

Furthermore, an independent application program installed for use by other application programs can be used. For example, an OCR engine implements only a character recognition process from the image data. Since the OCR engine does not operate individually, the OCR engine is used as a part (module) of other application programs.

Thus, since each of the application programs can be executed under the management of the OS in the entirety of the information processing unit part B, an application program having these functions can be developed.

However, in the conventional technology, the functions of the image processing unit part A and others cannot be directly used by such means.

In other words, as discussed above, in the digital color multifunction processing machine 1, the image processing unit part A for implementing the original function of the multifunction processing machine and the information processing unit part B for implementing the application programs are provided. The image processing unit part A and the information processing unit part B are connected to each other via the LAN 2 by the network protocol (TCP/IP in this example) in the digital color multifunction processing machine 1.

Since the image processing unit part A and the information processing unit part B are physically connected, it is possible to mutually communicate data between the image processing unit part A and the information processing unit part B. However, in the conventional technology, the function of the image processing unit part A cannot be used from inside of the application program executing in the information processing unit part B.

Here, means for using the function of the image processing unit part A from inside of the application program executing in the information processing unit part B are discussed.

For example, in the keyword generation application, the image data are read from the image reading device 8 managed by the image processing unit part A.

In order to instruct the image reading device 8 to perform image reading operations, it is necessary to designate the port number 1001 and request a TCP/IP-connection to the image processing unit part A. At this time, data indicating the contents of the process are simultaneously sent as a data stream.

In the function designated by the port number 1001, the image reading device 8 reads the image. An optional file name is added to the image data and the image data are transferred to the information processing unit part B. The contents of such a process are determined in advance. The port number is allocated so that these functions are individually used.

Thus, the functions of the image processing unit part A can be used from the keyword generation application. The communication protocol is not limited to TCP/IP but may be other types of protocols.

Figure 5:
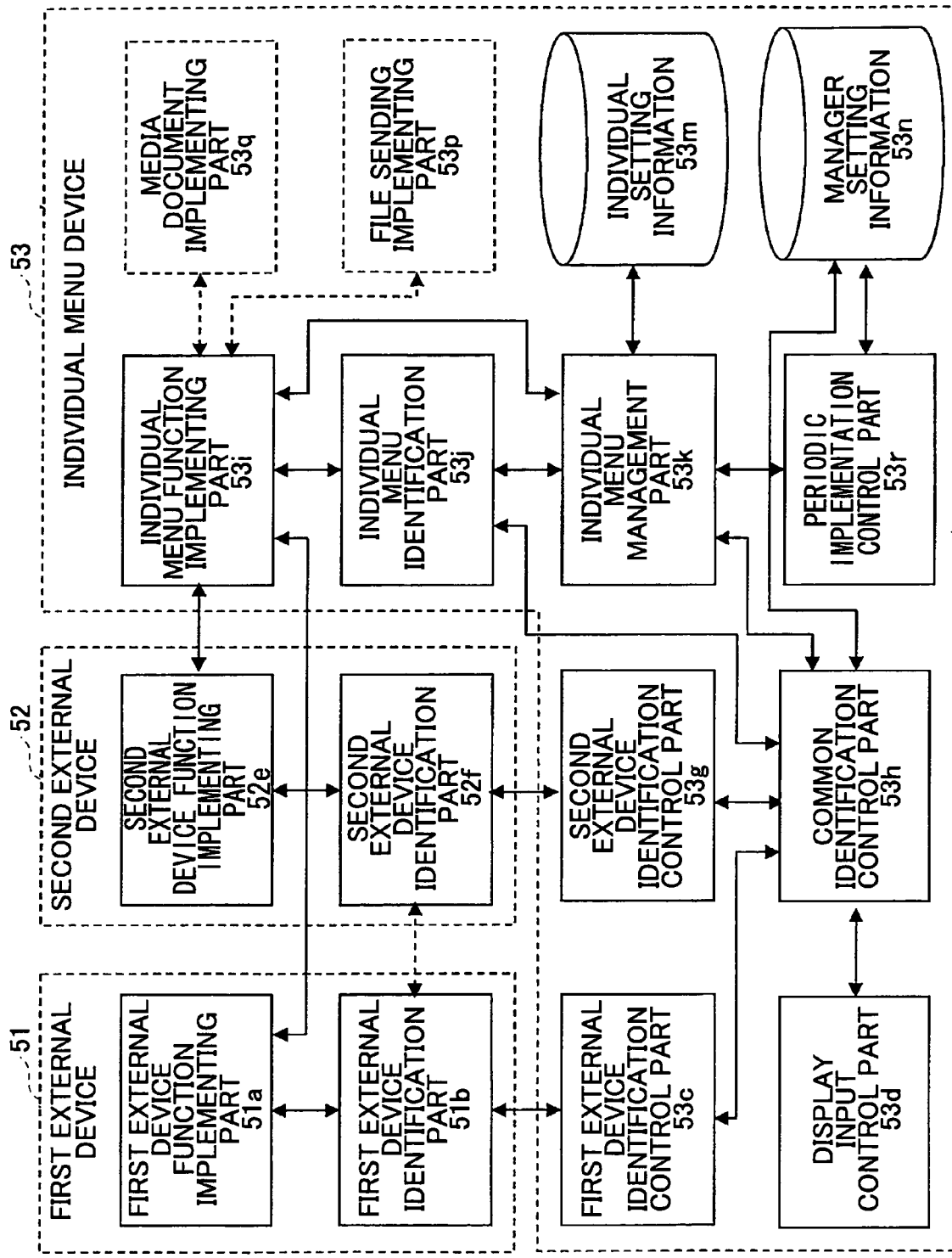
FIG. 5 is a block diagram showing a functional structure for controlling identifying action in the embodiment of the present invention.

FIG. 5 is a block diagram showing a functional structure for controlling identifying action in the embodiment of the present invention. In FIG. 5, arrows connecting blocks represent main flows of signals. This does not limit the function of each of the blocks. In addition, in FIG. 5, a first external device 51 corresponds to the server computer 3 shown in FIG. 1. A second external device 52 corresponds to the image processing unit part A shown in FIG. 3. An individual menu device 53 corresponds to the information processing unit part B shown in FIG. 3.

Figure 6:
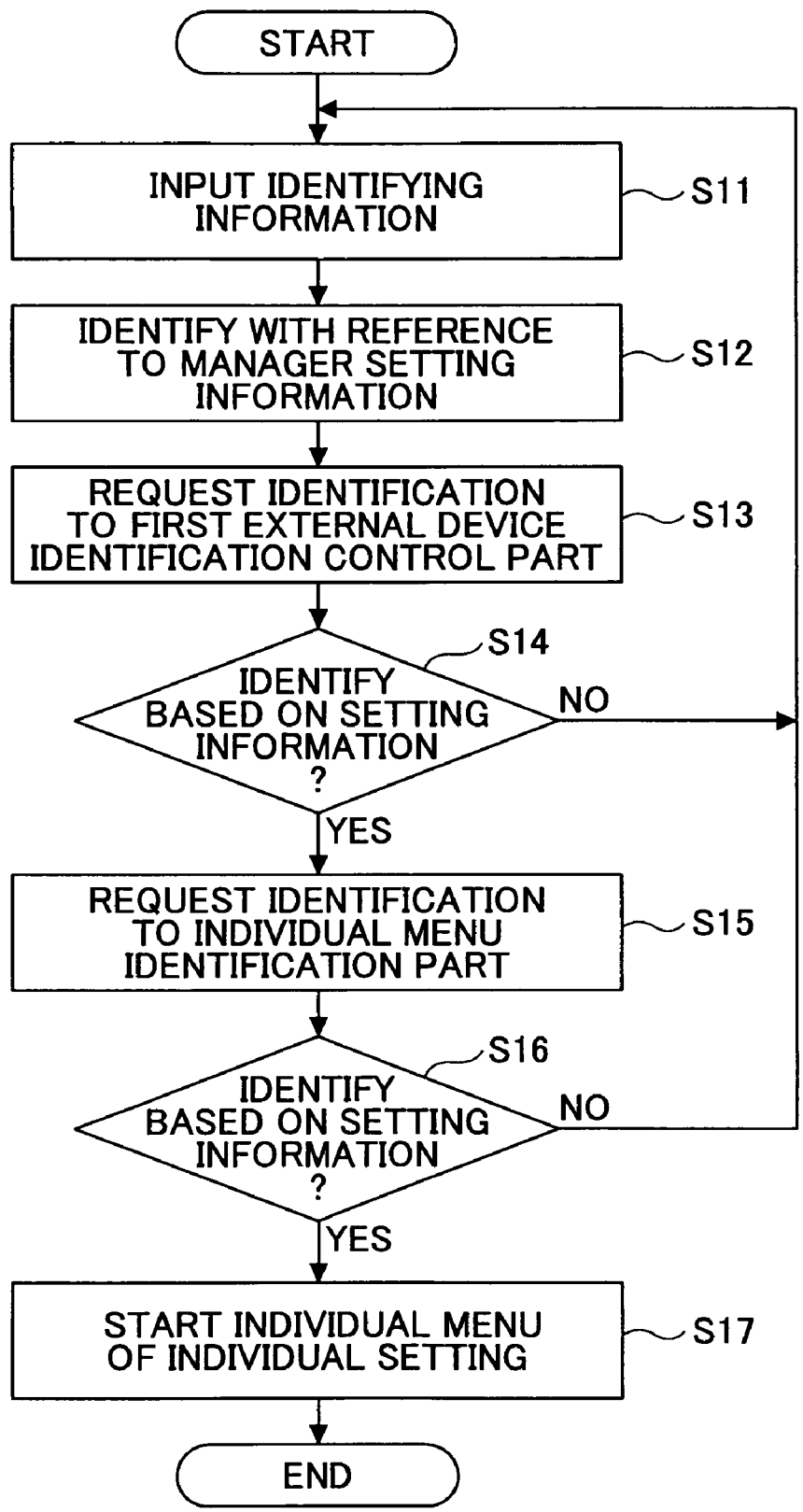
FIG. 6 is a flowchart showing an operation of identifying action of an individual menu device of the digital color multifunction processing machine of the embodiment of the present invention.

FIG. 6 is a flowchart showing an operation of identifying action of an individual menu device of the digital color multifunction processing machine of the embodiment of the present invention.

Based on the flowchart of FIG. 6, the operation in the embodiment of the present invention is discussed with reference to FIG. 5.

As an identifying action in the digital color multifunction processing machine 1 shown in FIG. 6, a display input control part 53d of the individual menu device 53 receives identifying information of the user (user name, password, ID card for identifying, and others) from the main picture displayed at the operations panel P (See FIG. 4), for example in step S11. The identifying information of the user is input from the input picture of the identifying information by pushing the individual identifying key.

The display input control part 53d transfers the input identifying information to a common identification control part 53h. The common identification control part 53h identifies the information following the setting of a manager setting information 53n in step S12. Here, in setting the manager setting information 53n, in a case where the item (1) of a management setting table shown in FIG. 7 is "EXTERNAL DEVICE IDENTIFICATION: YES", the identification is requested in order based on the setting of the item (2) of the management setting table "PRIORITY IDENTIFICATION SETTING: FIRST=FIRST EXTERNAL DEVICE, SECOND=INDIVIDUAL MENU DEVICE" in step S3.

One of "FIRST EXTERNAL DEVICE", "SECOND EXTERNAL DEVICE", and "INDIVIDUAL MENU DEVICE" is set as a first item of priority identification setting. The device which is priority identification set is indicated at the items (3) "FIRST EXTERNAL DEVICE IDENTIFICATION: YES" or (5) "SECOND EXTERNAL DEVICE IDENTIFICATION: YES".

In the case of the item (2) of the management setting table "PRIORITY IDENTIFICATION SETTING: FIRST=FIRST EXTERNAL DEVICE, SECOND=INDIVIDUAL MENU DEVICE", the common identification control part 53h requests, in step S13, the identification of the first external device from a first external device identification control part 53c by the identification information of the user input in step S11. The first external device identification control part 53c, in step S14, determines the identification with a first external device identification part 51b by an existing protocol. If this identification is not successful (NO in step S14), the identification flow of the user goes back to the beginning. If this identification is successful (YES in step S14), the common identification control part 53h request identification of the individual menu to a individual menu identification part 53j in step S5.

The individual menu management 53k determines, with reference to the individual setting information 53m, the requested identification in step S16. If the identification is successful (YES in step S16), the individual menu identification part 53j requests the individual menu function implementing part 53i to start the individual menu. If this identification is not successful (NO in step S16), the flow of identifying the user goes back to the beginning.

The individual menu function implementing part 53i obtains the individual setting information 53m via the individual menu management part 53k so as to start the individual menu at the individual setting in step S17. Thus, the identification flow to the individual menu device 53 is implemented as discussed above. At this time, since the identification performed by first external device identification part 51b was successful, the function of a first external device function implementing part 51a can be used from the individual menu of the individual menu function implementing part 53i.

Figure 9:
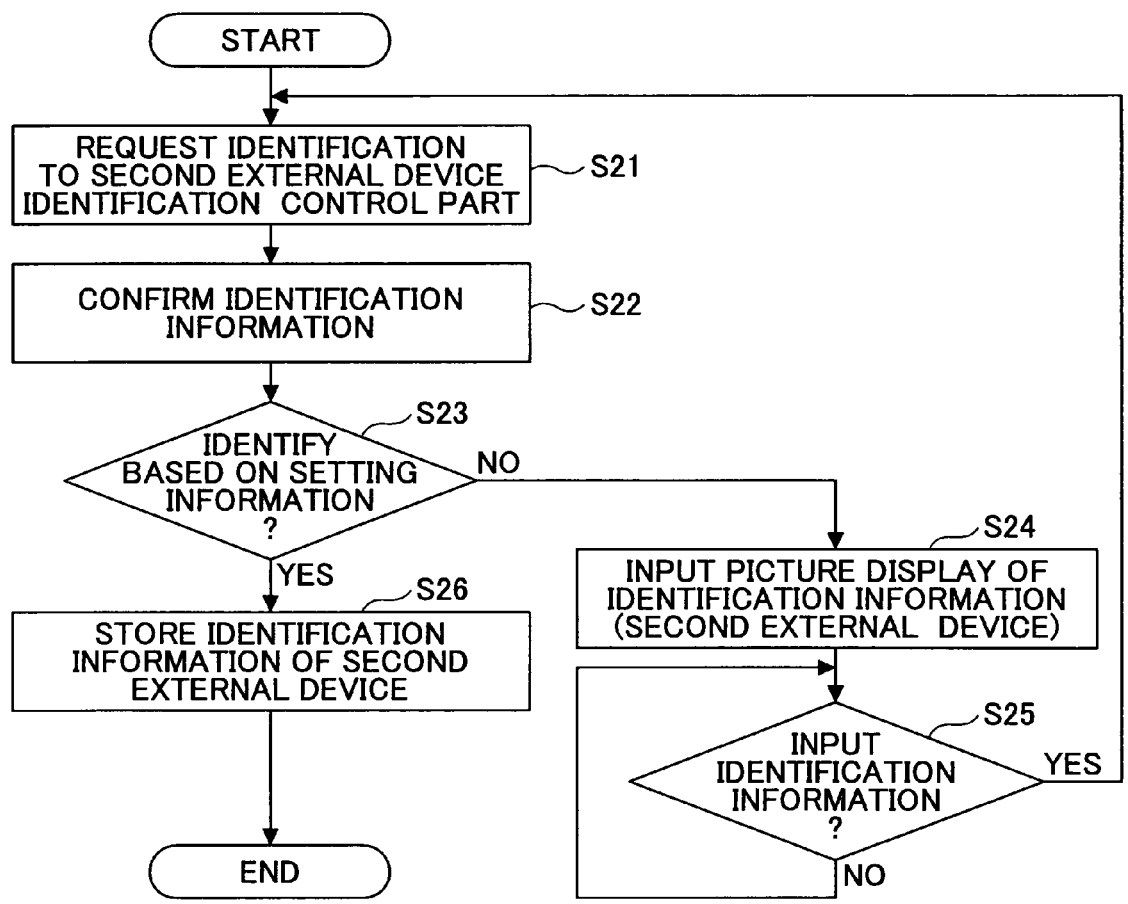
FIG. 9 is a flowchart showing an operation of identifying action of a second external device after the first external device and the individual menu device are identified, of the embodiment of the present invention.
Figure 10:
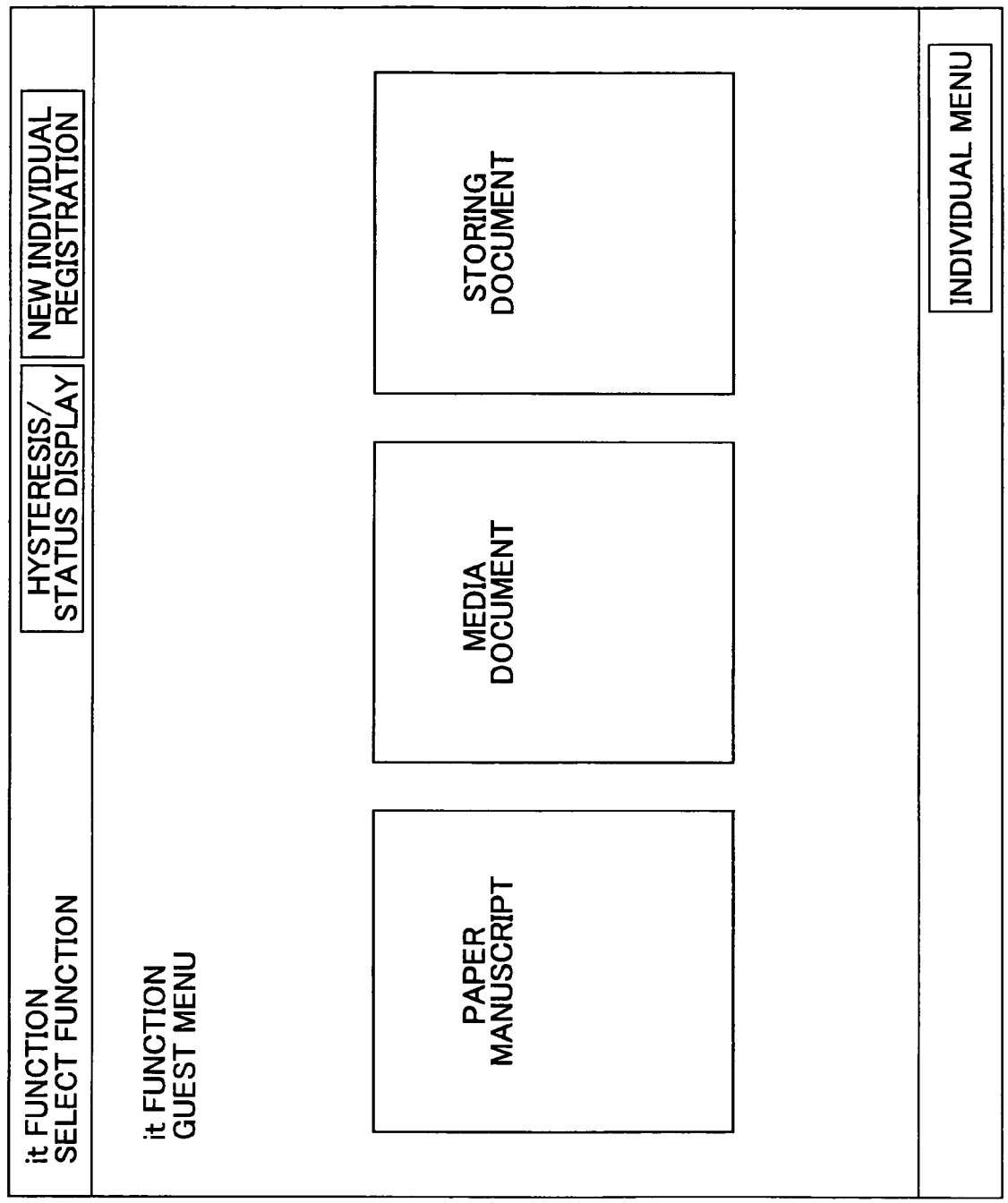
FIG. 10 is a view showing a main screen displayed on a displaying device.

Meanwhile, FIG. 9 is a flowchart showing an operation of additional identifying action of the second external device after the first external device and the individual menu device are identified.

Referring to FIG. 9, at the same time as starting the individual menu or corresponding to the request for using the function of the second external device, the common identification control part 53h requests the identification of the second external device from the second external device identification control part 53g in step S21 so that the second external device identification control part 53g implements identification with a second external device identification part 52f. At this time, the common identification control part 53h confirms so as to obtain "SECOND EXTERNAL DEVICE IDENTIFICATION INFORMATION" of the item (6) of the individual setting table shown in FIG. 8 in step S22. This "SECOND EXTERNAL DEVICE IDENTIFICATION INFORMATION" of the item (6) of the individual setting table shown in FIG. 8 is the individual setting information 53m of the individual menu identified via the individual menu management part 53k. Here, the existence of registration of the identifying information or whether the information is the input identification information is confirmed.

In step S22, if the identification information is not registered at "SECOND EXTERNAL DEVICE IDENTIFICATION INFORMATION" of the item (6) of the individual setting table shown in FIG. 8, since the identifying process with the first external device is already completed, the identification information identified by the first external device is used. If the identification information is registered at "SECOND EXTERNAL DEVICE IDENTIFICATION INFORMATION" of the item (6) of the individual setting table shown in FIG. 8, the identification information is obtained and the second external device identification control part 53g implements identification with the second external device identification part 52f in step S23. If this identification is successful (YES in step S23), the individual menu function implementing part 53i can use the function of a second external device function implementing part 52e.

If this identification is not successful (NO in step S23), the common identification control part 53h displays an input dialog on the display input control part 53d again in step S24. This is displayed on a picture as the function of the second external device function implementing part 52e from the individual menu function implementing part 53i. Implementation of the function of the individual menu function implementing part 53i or the first external device function implementing part 51a is not obstructed.

If the user inputs correct identification information to the input dialog (display picture in step S13) (YES in step S25) the common identification control part 53h requests the second external device identification control part 53g to implement the identification with the second external device identification part 52f again in step S21. If the input identification information is confirmed in step S22 and determination of the identification based on this identification information is successful (YES in step S23), the common identification control part 53h stores, via the individual menu management part 53k, correct identification information in "SECOND EXTERNAL DEVICE IDENTIFICATION INFORMATION" of the item (6) of the individual setting information 53m shown in FIG. 8 in step S26. This correct identification information is used next time when the second external device identification control part 53g implements the identification with the second external device identification part 52f.

As a result of this, in a case where "SECOND EXTERNAL DEVICE IDENTIFICATION INFORMATION" of the item (6) of the individual setting table shown in FIG. 8 is not registered, the identification flow fails only the first time. However, in the identification flow after the second time, the stored information can be used. If the first external device is designated as the subject of the priority identification, the identification flow is completed by only the first external device and the individual menu device. The second external device implements the identification when the function of the second external device function implementing part 52e is used in the individual menu. Because of this, if the user registration of the first external device is identical with user registration of the individual menu, the identification flow is successful. The second external device may identify when the function is required.

By the identification action discussed above, it is possible to use functions of various devices connected to the network and the digital color multifunction processing machine 1. A main screen shown in FIG. 10 of the display device shown in FIG. 4 is displayed on the digital color multifunction machine. Three input means, "paper manuscript", "media document" and "storing document" of the main screen can be selected. By each of the input means, data can be input and output. By pressing the "individual menu" of the main screen, the individual menu appears based on the identification.

By the "paper manuscript" displayed on the main screen, the manuscript input by the image reading device 8 shown in FIG. 3 is set at plural times and read out as a single document file so as to be output by sending and storing. By the "media document", the document file is read out from the common folder of the computer identified by the network connection or the recording medium M is read out so as to be output by sending, storing and printing.

By the "storing document", a general document (data read out by the image reading device 8, receiving data of facsimile or e-mail, map data, or the like) storing device provided in the digital color multifunction machine 1 is read out so as to be output by sending, storing and printing.

Figure 11:
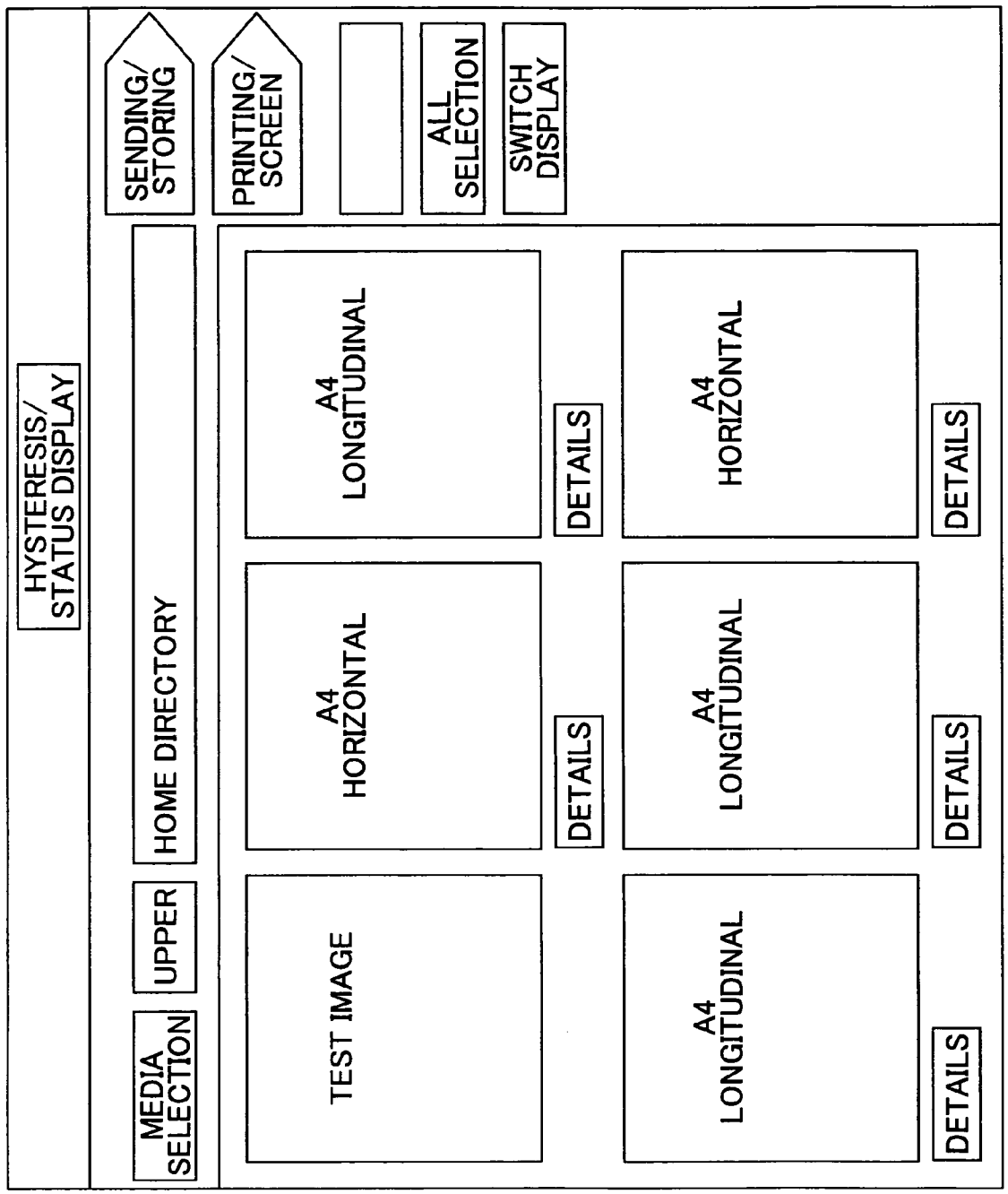
FIG. 11 is a view showing a screen of media document displayed on a display device.

For example, in a case where the "media document" handling digitalized data is selected, a thumbnail or list of the media documents stored in the corresponding media as shown in FIG. 11 is displayed. When document selection is made by the user from this display, a process desirable for the user such as sending, storing, printing or the like is implemented in the document file to be a subject. If the storing process is implemented in the selected document file, a character recognition process (OCR) is implemented so that the file is stored in the storing device as data whose full text can be retrieved.

Registration of the common media is managed by methods for registering the setting information of the network media connected via the LAN 2 such as the common folder (folder of Windows (registered trademark), Web, FTP, or the like) on the server computer 3 or a storage medium M of local media connected to a main body side of the digital color multifunction machine 1. In addition, as sending processes for outputting document data, there are an e-mail sending, a facsimile sending, a file sending, and others. An e-mail address, a facsimile address, a file address, and others are managed as registration addresses.

In order to implement a sending process of the selected document file, there are, as an e-mail address, "name for identifying an address of an e-mail", "e-mail address", "belonging", and "sending option designation". For setting the "sending option designation", there are "Internet facsimile sending" indicating Internet facsimile sending, "SMTP server address" for designating an SMTP server, "e-mail sending identification" for identifying at the time of e-mail sending, and "OCR address designation".

In a case of the "e-mail sending identification", there are "identification POP server address", "identification user name" and "identification password". In a case of the "Internet facsimile sending", all files attached to the e-mail address are converted to network facsimile images (TIFF-F) so as to be sent.

In a case of "OCR address designation", if there is a bad OCR situation in the document or there is no hit, the document is sent to the registered e-mail address is implemented.

This e-mail address can be registered from an e-mail address obtained from an e-mail server using LDAP (Lightweight Directory Access Protocol) (using an open address book function).

In a case of the facsimile, "name" for identifying a facsimile address, "facsimile number", "belonging", and "sending option designation" are used.

In the case of the file, "name" is used for identifying the address of the file, "network path" is used for the value of the network path when sending the file to the folder of Windows (registered trademark)/FTP/Web (external server) on the network, "identification user name", "identification password", and "sub-folder name selection" are used for registering the sub-folder name made in the host device of the file address, and "communication option designation" is used for designating the handling of a language code. A sending process for identifying the address of the document file is selected by using these information items.

The digital color multifunctional machine 1 (individual menu device) shown in FIG. 1 obtains, in order to manage user management information of the server computer 3 (first external device) first identified, corresponding user management information (property) from an active directory (directory service of Windows (registered trademark) which manages a hardware resource of an information device connected to the LAN 2, user properties using them, and information such as an access right in a unified manner. This process obtains the user management information every time when the first external device is identified, registers the individual setting information 53*m* (individual setting table of FIG. 8), and renews it if it is already registered.

The user management information of the active directory includes an identification user name, an identification password, a common folder (a directory that can be freely used by the user and prepared for every user), an e-mail address, and others. As registration of the e-mail address obtained from the user management information as an opening address book function or information of the home directory that is a folder permitted to be used by the user and registered to the common media, the setting of "COMMON MEDIA INFORMATION: NAME=HOME DIRECTORY, REGISTRATION ADDRESS=HOME DIRECTORY" of the individual setting table shown in FIG. 8, is automatically registered.

In addition, as information of the registration address, the setting of "REGISTRATION ADDRESS: NAME=HOME DIRECTORY, NETWORK PASS=YES" of the individual setting table shown in FIG. 8, is automatically registered. Even if setting information (directory path) of the home directory is changed in the first external device, setting the network path is renewed at the time of next identification so as to follow the change. Furthermore, the directory path at the registration address is automatically registered and renewed as a link to the common media (home directory).

In addition, "NEWEST USING STATE STORING AREA" of the item (12) of the individual setting table is renewed every time when the directory path of the folder selected by the common media is recorded and changed. Because of this, by referring to this after the time of next identification, the directory path of the folder last selected from the common media used is indicated.

FIG. 12 shows relationship between the common media and the address of registration (file). As corresponding to "name" and "file address ID" of the common media, "name", "network pass", "identification user name" and "identification password" of the file address are registered.

For example, the common media of "ID=7" shown in FIG. 12 is made of registration information such as "name=home directory", "file address ID=8", "file arrangement order", and others.

The file address corresponding to "file address ID=8" is "ID=8". There are registration information of "name=home directory", "network pass=a value instructed by the use management information of the active directory", "identification user name", "identification password" being identification information of the first external device, "sub-folder name selection", (FTP Japanese mode), (FTP data forwarding mode), (OCR address designation) and others of "communication option setting". In addition, the common media and the file address can be individually added. By setting the common media and the file address corresponding to each other with the ID, it is possible to manage them as common media of the individual menu in a unified manner.

Because if this, between the digital color multifunctional machine and the server computer, at the individual menu after the identification, the folder managed by the user management information managed by the active directory of the server computer is automatically registered as the home directory of the common media, so that it is possible to operate this as well as other media provided in the device.

In addition, by registering the name or icon registered in the common media in the menu screen of the display device 40 of FIG. 4 by using the file address linked to the common media, the selection from the display of the display device 40 by the user is made so that it is possible to select the desirable document file and easily output this by the function of sending, storing or printing.

Figure 13:
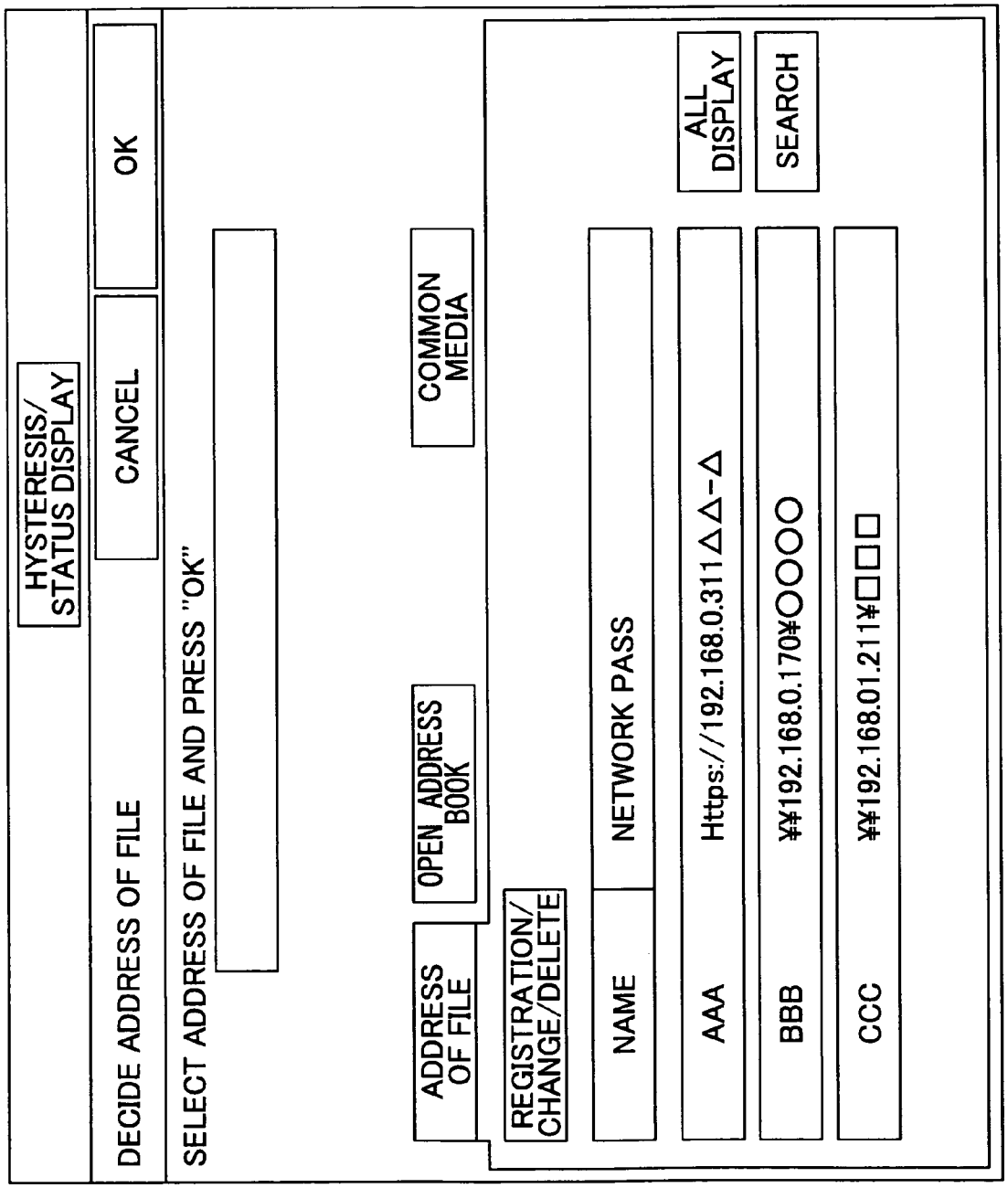
FIG. 13 is a view showing an "address selection" screen displayed on the display device.
Figure 14:
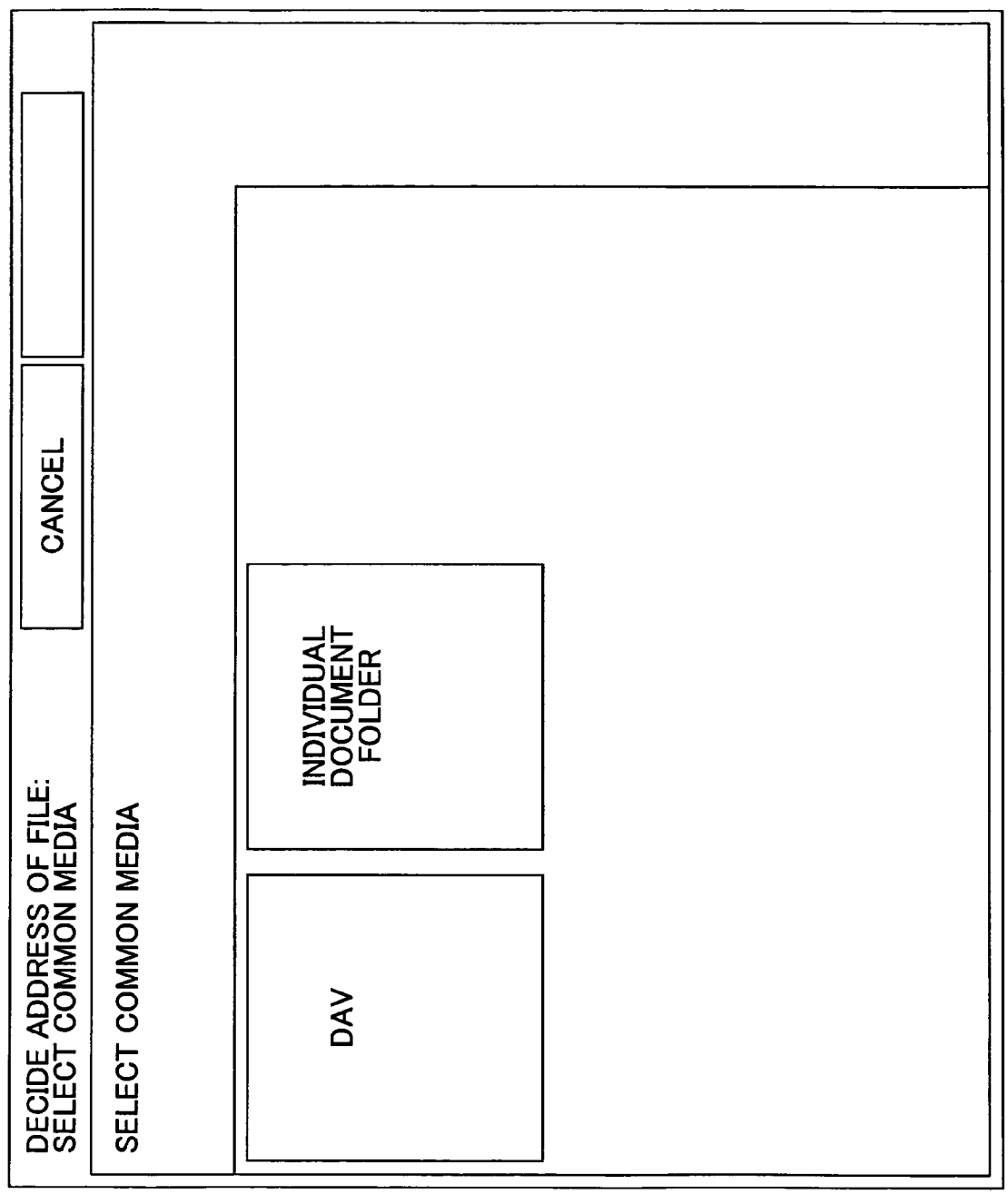
FIG. 14 is a view showing a "common media" screen displayed on the display device.
Figure 15:
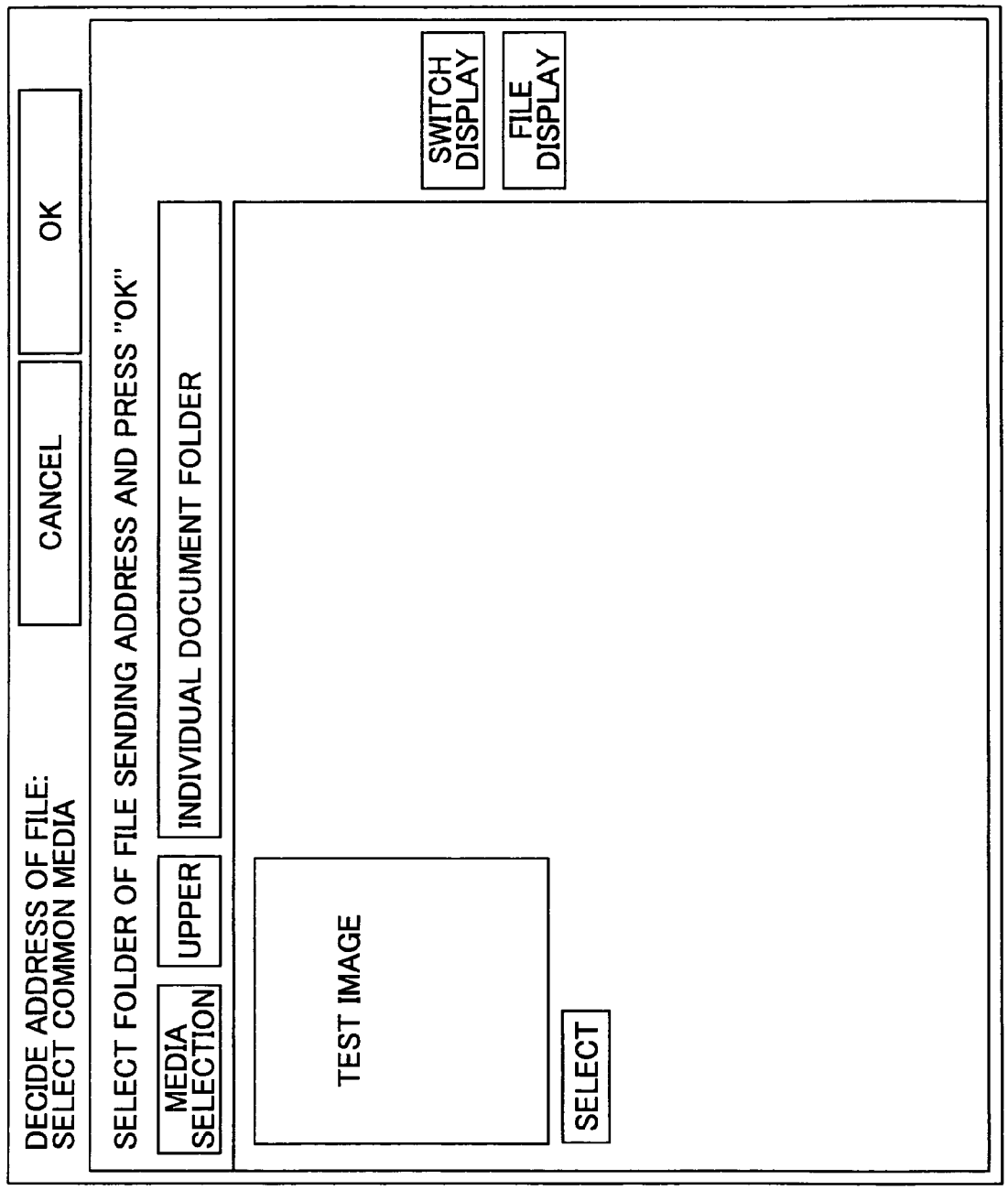
FIG. 15 is a view showing a "directory display" screen displayed on the display device.
Figure 16:
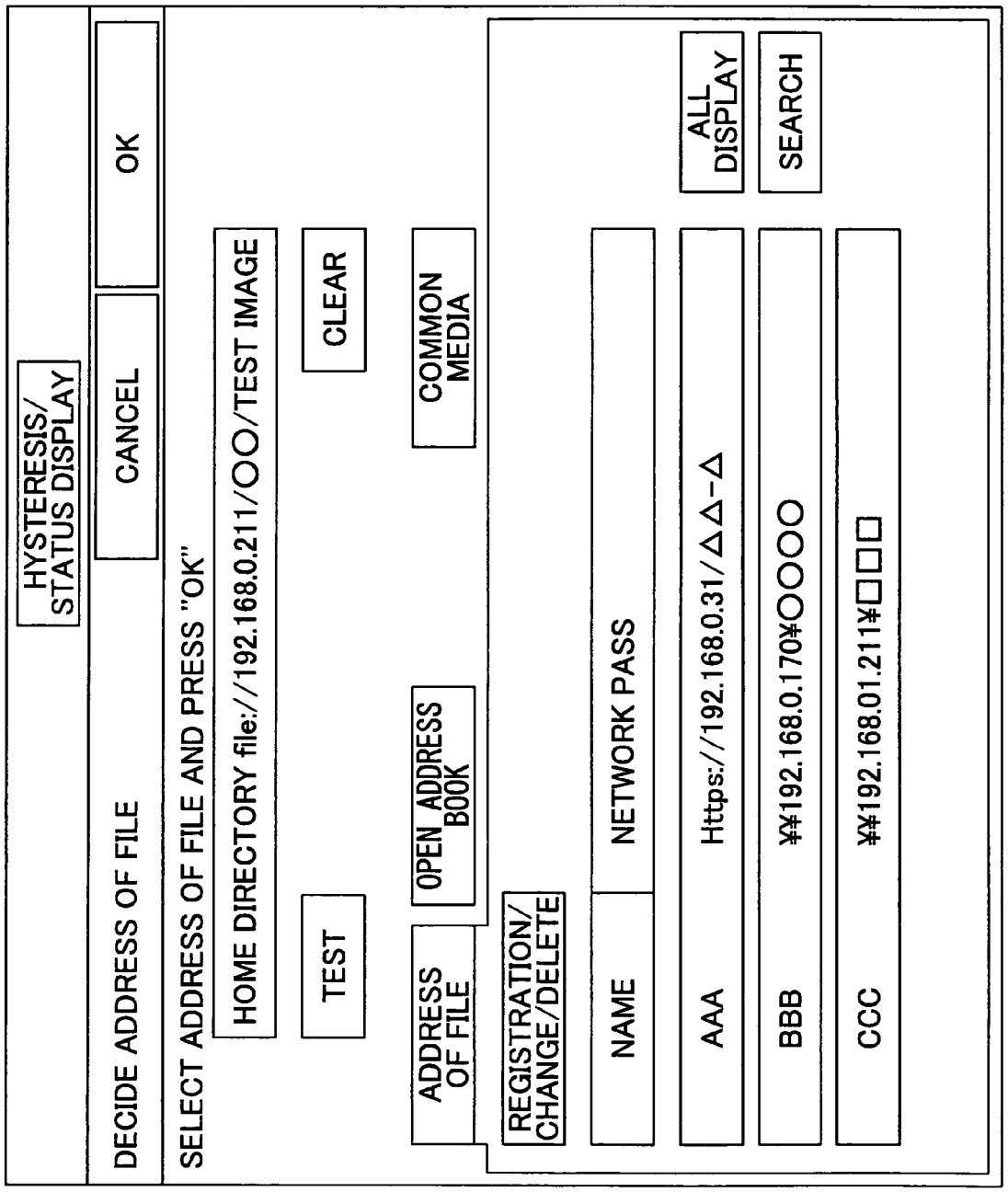
FIG. 16 is an "address selection" screen displayed on the display device.

FIG. 13 through FIG. 17 are views showing screen displayed when the file address is selected from the common media. Hereinafter, a case where the document file desirable for the user is sent to "AAA, BBB, CCC" is discussed. "Address section" screen shown in FIG. 13 is displayed from "sending/storing" screen (not shown) via "file sending" screen (not shown). By pressing "common media" on the "address selection" screen, the "common media" screen shown in FIG. 14 is displayed. By pressing the "individual document folder" selected from the displayed media, the "directory display" screen indicating inside of the selected "individual document folder" shown in FIG. 15 is displayed.

Figure 17:
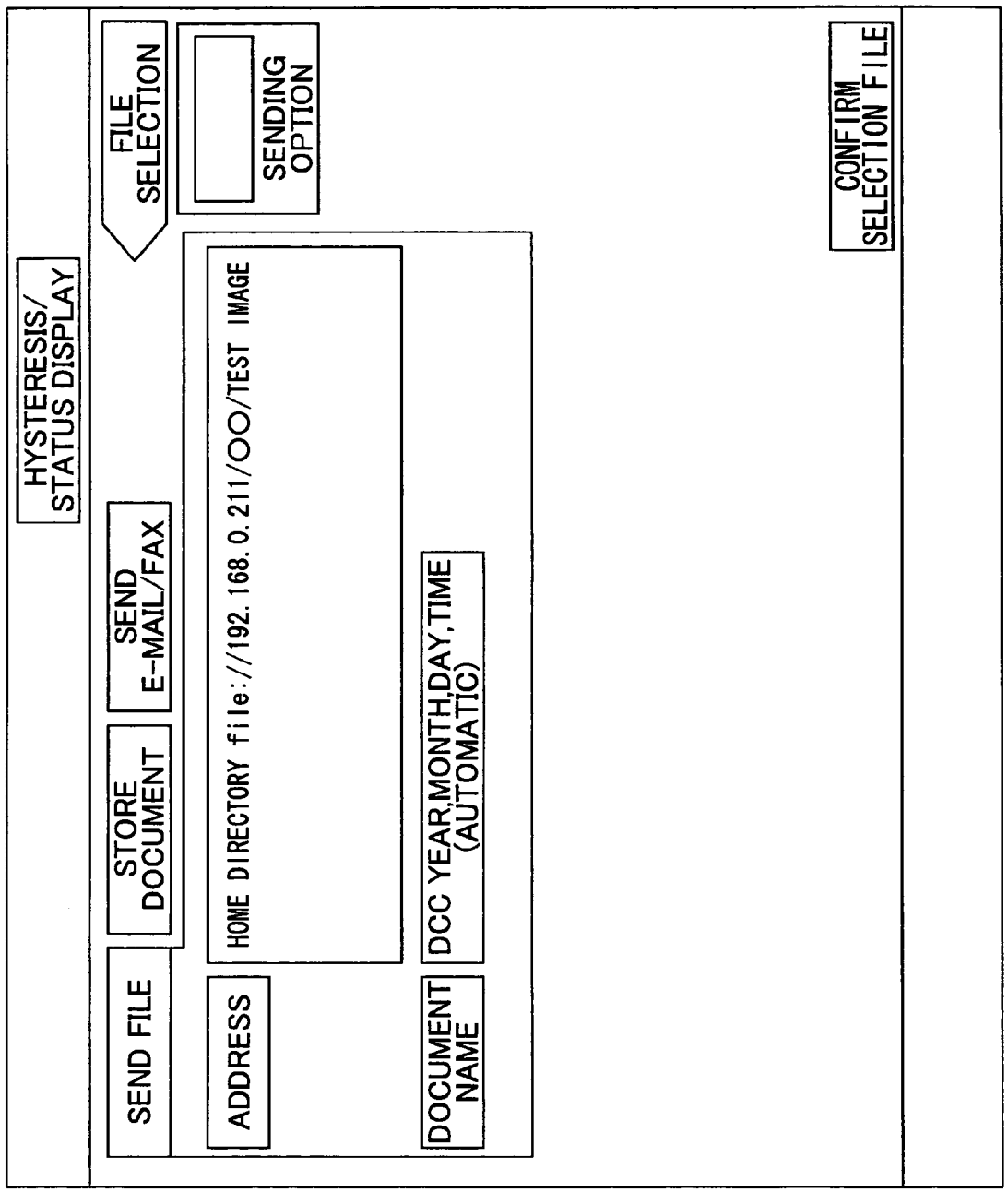
FIG. 17 is a view of a screen displayed on the display device after selection from the common media is made.

By pressing "selection" for selecting the document file "test image" in the displayed directory and further pressing "OK", the "address selection" screen shown in FIG. 13 where the directory "individual document folder" selected as shown in FIG. 13 is input is displayed. By pressing the "OK" on this screen, the screen after the selection is made from the common media as shown in FIG. 17 is displayed. By pressing the "start" key of the operations input device 41, the file is sent.

In addition, as the "open address book" shown in FIG. 13, a list of the address information obtained based on the designated conditions is indicated from the user management information opened and managed by the active directory in the identified server computer so that the address from this can be selected.

Thus, it is possible to easily and properly process the document file or the like even if the operations panel of a device for specific use such as a digital color multifunctional machine does not have good operability as compared to the normal computer.

In the input and output device of the present invention, identification based on the identification information of the server computer connected to the network is implemented. The user management information that is managed by the active directory of the server computer being identified is obtained. The folder managed by the user management information as a home directory and the storing media of the device are registered in the common media and managed in a uniform manner. As a result of this, it is possible to improve the operability of the file selection in the input and output device such as a digital color multifunctional device for a specific use where there are limitations in the input operations. Hence, this input and output device is useful as a device connected to a network and using plural communication protocols, the input and output device communicating documents in various data forms to and from plural information devices.

The present invention is not limited to these embodiments, but variations and modifications may be made without departing from the scope of the present invention.

This patent application is based on Japanese Priority Patent Application No. 2005-251306 filed on Aug. 31, 2005, the entire contents of which are hereby incorporated by reference.

What is claimed is:

1. An input and output device, comprising:
a first identifying part configured to identify a user that is attempting to operate a portion of the input and output device so that a function of an information device can be used by individual identification;
a second identifying part configured to identify the user so that a function of the input and output device can be used by the individual identification; and
a registration part configured to register folders permitted to be used by the user identified by the first identifying part and the second identifying part in common media and register setting information from a recording medium provided in the input and output device in the common media,
wherein at least one registered folder is permitted to receive a document selected by the user via a network.

2. The input and output device as claimed in claim 1, wherein the registration part further registers folders for document selection in the common media, wherein the registered folders permitted to be used by the user and the registered folders for document selection can be commonly used.

3. The input and output device as claimed in claim 1, further comprising:
user management information part configured to manage folders based on user management information, wherein the registration part registers the folders managed by the user management information part as the folders permitted to be used by the user in the common media.

4. The input and output device as claimed in claim 3, wherein, in a case where the folders managed by the user management information part is registered in the common media as the folders permitted to be used by the user, information of the folders managed by the user management information is renewed.

5. The input and output device as claimed in claim 3, further comprising:
a storing part configured to store and renew a directory path of folders selected from the common media, wherein when the directory path is renewed, the renewed directory path is displayed at a time of next identification of the user.

6. The input and output device of claim 1, wherein the setting information includes information on a directory path for each of the registered folders.

7. An input and output device, comprising:
first identifying means for identifying a user that is attempting to operate a portion of the input and output device so that a function of an information device can be used by individual identification;
second identifying means for identifying the user so that a function of the input and output device can be used by the individual identification; and
registration means for registering folders permitted to be used by the user identified by the first identifying means and the second identifying means in common media and register setting information from a recording medium provided in the input and output device to the common media,
wherein at least one registered folder is permitted to receive a document selected by the user via a network.

8. The input and output device as claimed in claim 7, wherein the registration means further registers folders for document selection in the common media, wherein the registered folders permitted to be used by the user and the registered folders for document selection can be commonly used.

9. The input and output device as claimed in claim 7, user management information means for managing folders based on user management information, wherein the registration means registers the folders managed by the user management information means as the folders permitted to be used by the user in the common media.

10. The input and output device as claimed in claim 9, wherein, in a case where the folders managed by the user management information means is registered in the common media as the folders permitted to be used by the user, information of the folders managed by the user management information is renewed.

11. The input and output device as claimed in claim 9, further comprising:
a storing means for storing and renewing a directory path in folders selected from the common media, wherein when the directory path is renewed, the renewed directory path is displayed at a time of next identification of the user.

12. The input and output device of claim 7, wherein the setting information includes information on a directory path for each of the registered folders.

13. A method of communicating documents in an input and output device, comprising:
first identifying a user that is attempting to operate a portion of the input and output device so that a function of an information device can be used by individual identification;
second identifying the user so that a function of the input and output device can be used by the individual identification; and
registering folders permitted to be used by the user identified by the first identifying and the second identifying in common media and registering setting information from a recording medium provided in the input and output device to the common media,
wherein at least one registered folder is permitted to receive a document selected by the user via a network.

14. The method as claimed in claim 13,
wherein the registering further registers folders for document selection in the common media, wherein the registered folders permitted to be used by the user and the registered folders for document selection can be commonly used.

15. The method as claimed in claim 13, further comprising:
managing folders based on user management information, wherein the registering registers the folders managed by the managing as the folders permitted to be used by the user in the common media.

16. The method as claimed in claim 15,
wherein, in a case where the folders managed by the user management information is registered in the common media as the folders permitted to be used by the user, information of the folders managed by the user management information is renewed.

17. The method as claimed in claim 15, further comprising:
storing and renewing a directory path of folders selected from the common media, wherein when the directory path is renewed, the renewed directory path is displayed at a time of next identification of the user.

18. The method of claim 13, wherein the setting information includes information on a directory path for each of the registered folders.

* * * * *

UNITED STATES PATENT AND TRADEMARK OFFICE
CERTIFICATE OF CORRECTION

| | |
|---|---|
| PATENT NO. | : 8,284,425 B2 |
| APPLICATION NO. | : 11/509590 |
| DATED | : October 9, 2012 |
| INVENTOR(S) | : Kasatani |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1686 days.

Signed and Sealed this
Twenty-third Day of September, 2014

Michelle K. Lee
*Deputy Director of the United States Patent and Trademark Office*